(12) United States Patent
Lin

(10) Patent No.: US 11,164,290 B2
(45) Date of Patent: Nov. 2, 2021

(54) METHOD AND SYSTEM FOR IMAGE BLURRING PROCESSING

(71) Applicant: Wistron Corporation, New Taipei (TW)

(72) Inventor: Ge-Yi Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 101 days.

(21) Appl. No.: 16/404,750

(22) Filed: May 7, 2019

(65) Prior Publication Data

US 2020/0273152 A1 Aug. 27, 2020

(30) Foreign Application Priority Data

Feb. 26, 2019 (TW) .................................. 108106469

(51) Int. Cl.
| G06T 5/00 | (2006.01) |
| G06T 5/20 | (2006.01) |
| G06T 7/50 | (2017.01) |
| G06K 9/00 | (2006.01) |
| G06T 5/50 | (2006.01) |

(52) U.S. Cl.
CPC .......... G06T 5/002 (2013.01); G06K 9/00496 (2013.01); G06T 5/20 (2013.01); G06T 5/50 (2013.01); G06T 7/50 (2017.01); *G06T 2207/20224* (2013.01)

(58) Field of Classification Search
CPC .. G06T 5/002; G06T 5/20; G06T 5/50; G06T 7/50; G06T 2207/20224; G06K 9/00496
See application file for complete search history.

(56) References Cited

U.S. PATENT DOCUMENTS

| 5,475,507 | A | * | 12/1995 | Suzuki | ...................... G06T 7/12 358/500 |
| 10,217,195 | B1 | * | 2/2019 | Agrawal | ................... G06T 7/11 |
| 2017/0124717 | A1 | * | 5/2017 | Baruch | ................... G06T 7/194 |

FOREIGN PATENT DOCUMENTS

| CN | 107509031 | 12/2017 |
| CN | 107566723 | 1/2018 |

OTHER PUBLICATIONS

"Office Action of China Counterpart Application", dated Mar. 11, 2021, p. 1-p. 10.

* cited by examiner

*Primary Examiner* — Zhitong Chen
(74) *Attorney, Agent, or Firm* — JCIPRNET

(57) ABSTRACT

A system and a method for image blurring processing are provided. The method includes: obtaining an image and a depth information corresponding to the image; identifying an object and a background in the image according to the depth information, wherein the object includes a plurality of object pixels and the background includes a plurality of background pixels; defining a number of an edge pixel spaced between the object and the background; performing a blurring processing on the edge pixel and the background pixels respectively by using a plurality of masks with different sizes; combining the plurality of object pixels, the edge pixel after the blurring processing, and the background pixels after the blurring processing to generate an output image; and outputting the output image.

12 Claims, 9 Drawing Sheets

| p1 | p2 | p3 | p4 | p5 | p6 | p7 | p8 | p9 | p10 | p11 | p12 | p13 | p14 | p15 | p16 | p17 | p18 | p19 | p20 |
|----|----|----|----|----|----|----|----|----|----|----|----|----|----|----|----|----|----|----|----|
| 0 | 0 | 0 | 0 | 0 | 0 | 0 | 0 | 0 | 63.8 | 191 | 255 | 255 | 255 | 255 | 255 | 255 | 255 | 255 | 255 |

| F1 | F2 | B1 | B2 | B3 |
|----|----|----|----|----|
| F3 | F4 | B4 | B5 | B6 |
| F5 | F6 | B7 | B8 | B9 |
| F7 | F8 | B10 | B11 | B12 |
| F9 | F10 | B13 | B14 | B15 |

METHOD AND SYSTEM FOR IMAGE BLURRING PROCESSING

CROSS-REFERENCE TO RELATED APPLICATION

This application claims the priority benefit of Taiwan application serial no. 108106469, filed on Feb. 26, 2019. The entirety of the above-mentioned patent application is hereby incorporated by reference herein and made a part of this specification.

BACKGROUND OF THE INVENTION

Field of the Invention

The invention relates to a method and a system for image processing, and more particularly, to a method and a system for image blurring processing for blurring an object edge in a captured image.

Description of Related Art

With the development of optical sensing elements and optical lenses and performance enhancement of image processing chips and software, digital cameras/video cameras and portable electronic products with lenses (such as mobile phones, tablets, notebooks, etc.) have long been indispensable electronic products in everyday life that allow us to take photos or take selfies and store them as digital images anytime, anywhere. However, in order to achieve a special visual effect with depth of field, there are products that blur the background of the captured image to highlight the subject.

However, in general, when blurring the background of an image, only the subject (such as a person) remains clear to highlight the effect of the photographed subject, but it may thus cause the edges of the subject to be visually too sharp and unnatural with respect to the blurred background. Therefore, traditionally, one solution is to use a blurry algorithm, which calculates the pixel values in the entire sliding window (or mask) for the entire image, but in this case, the color of the subject may blend with the background color, causing the edges of the subject to blur and spread outward.

SUMMARY OF THE INVENTION

The invention provides a method for image blurring processing and a system for image blurring processing that allows a processed image to achieve the effect of a blurred background and a clear edge of the foreground subject.

The invention provides a method for image blurring processing. The method includes the following steps. An image and a depth information corresponding to the image are obtained. An object and a background are identified in the image according to the depth information, wherein the object includes a plurality of object pixels and the background includes a plurality of background pixels. A number of the at least one edge pixel spaced between the object and the background is defined. A blurring processing is performed on the edge pixel and the plurality of background pixels respectively using a plurality of masks with different sizes. The plurality of object pixels, the edge pixel after the blurring processing, and the plurality of background pixels after the blurring processing are combined to generate an output image. The output image is outputted.

The invention provides a system for image blurring processing, including: an image-capture circuit, a depth-sensing circuit, and a processor. The image-capture circuit is used for obtaining an image. The depth-sensing circuit is used for obtaining a depth information corresponding to the image. The processor is coupled to the image-capture circuit and the depth-sensing circuit. The processor is used for performing the following operations. An object and a background are identified in the image according to the depth information, wherein the object includes a plurality of object pixels and the background includes a plurality of background pixels. A number of the at least one edge pixel spaced between the object and the background is defined. A blurring processing is performed on the edge pixel and the plurality of background pixels respectively using a plurality of masks with different sizes. The plurality of object pixels, the edge pixel after the blurring processing, and the plurality of background pixels after the blurring processing are combined to generate an output image. The output image is outputted.

Based on the above, the method for image blurring processing and the system for image blurring processing of the invention may divide an image into a plurality of regions such as an object (i.e., foreground), an edge of the object, and a background and perform blurring processing individually on the regions and then recombine the regions into an output image. By performing the blurring processing on individual regions, the processed image may achieve the effect of a blurred background and a clear object (person) and edge.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic of an example of a method for image blurring processing shown according to an embodiment of the invention.

DESCRIPTION OF THE EMBODIMENTS

Figure 1:
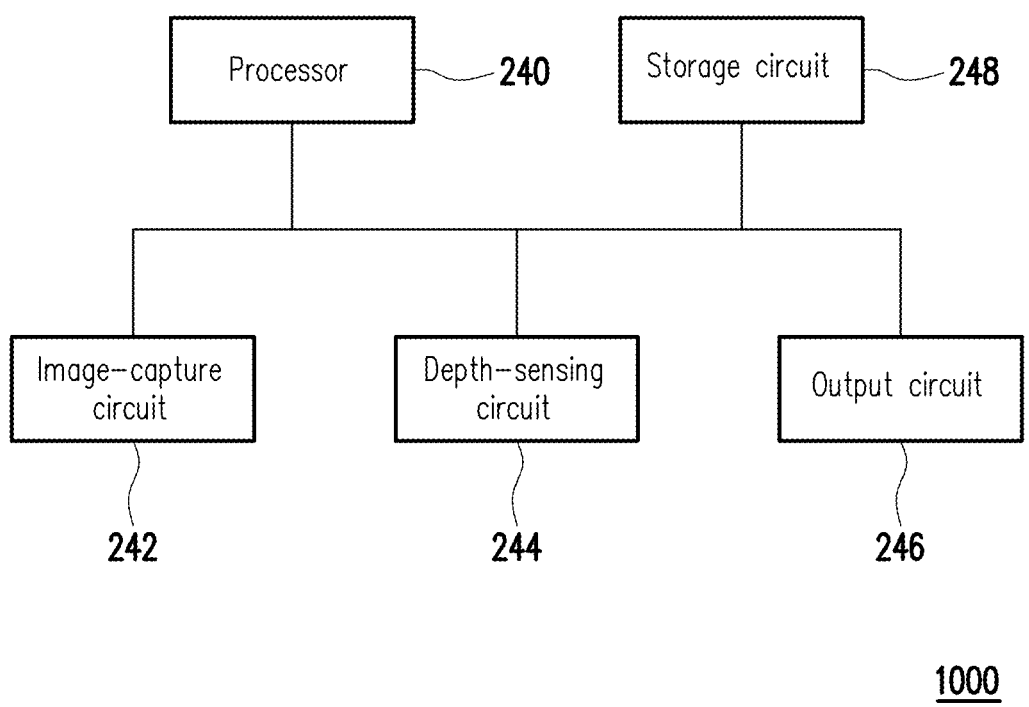
FIG. 1 is a schematic of a system for image blurring processing shown according to an embodiment of the invention.

Descriptions of the invention are given with reference to the exemplary embodiments illustrated with accompanied drawings. In addition, whenever possible, elements/components having the same reference numerals represent the same or similar parts in the figures and the embodiments.

FIG. 1 is a schematic of a system for image blurring processing shown according to an embodiment of the invention.

Referring to FIG. 1, a system 1000 for image blurring processing includes a processor 240, an image-capture circuit 242, a depth-sensing circuit 244, an output circuit 246, and a storage circuit 248. In particular, the image-capture circuit 242, the depth-sensing circuit 244, the output circuit 246, and the storage circuit 248 are respectively directly or indirectly electrically coupled to the processor 240. It should be noted that, in the present embodiment, the system 1000 for image blurring processing may be a desktop computer, a notebook computer, a tablet computer, an industrial computer, a server, a mobile phone, a handheld electronic device, or other types of electronic devices, and is not particularly limited.

The processor 240 may be a central processing unit (CPU) or a programmable general-use or special-use microprocessor, digital signal processor (DSP), programmable controller, application-specific integrated circuit (ASIC), or other similar devices or a combination thereof.

The image-capture circuit 242 is for capturing one or a plurality of images. For example, the image-capture circuit 242 may be equipped with a camera lens of a charge-coupled device (CCD), a complementary metal-oxide semiconductor (CMOS) device, or other types of photosensitive devices.

The depth-sensing circuit 244 may be another image-capture circuit that is the same as the image-capture circuit 242, which may be used to capture an image and allow the processor 240 to generate a depth map according to an image captured by the depth-sensing circuit 244 and an image captured by the image-capture circuit 242 to determine the depth of the object in the image captured by the image-capture circuit 242 (or the image captured by the depth-sensing circuit 244). Alternatively, the depth-sensing circuit 244 may also be an infrared sensor for emitting infrared light and receiving reflections of the infrared light to obtain depth. Alternatively, the depth-sensing circuit 244 may be another type of sensor that may obtain depth information, such as a structured light sensor, and is not limited herein.

The output circuit 246 may be associated circuitry for outputting a signal to a display or other electronic devices.

The storage circuit 248 may be any type of fixed or movable random-access memory (RAM), read-only memory (ROM), flash memory, a similar device, or a combination of the devices. In the present exemplary embodiment, a plurality of code snippets is stored in the storage circuit, and after the code snippets are installed, the code snippets are executed by the processor 240. For example, the storage circuit includes a plurality of modules, and the modules are respectively used to perform each operation of the image blurring processing method of the invention, wherein each module is composed of one or a plurality of code snippets. However, the invention is not limited thereto. Each operation of the system 1000 for image blurring processing may also be implemented using other hardware forms or with other software or integrating other software or replacing at least a part of the circuits with software.

Figure 2:
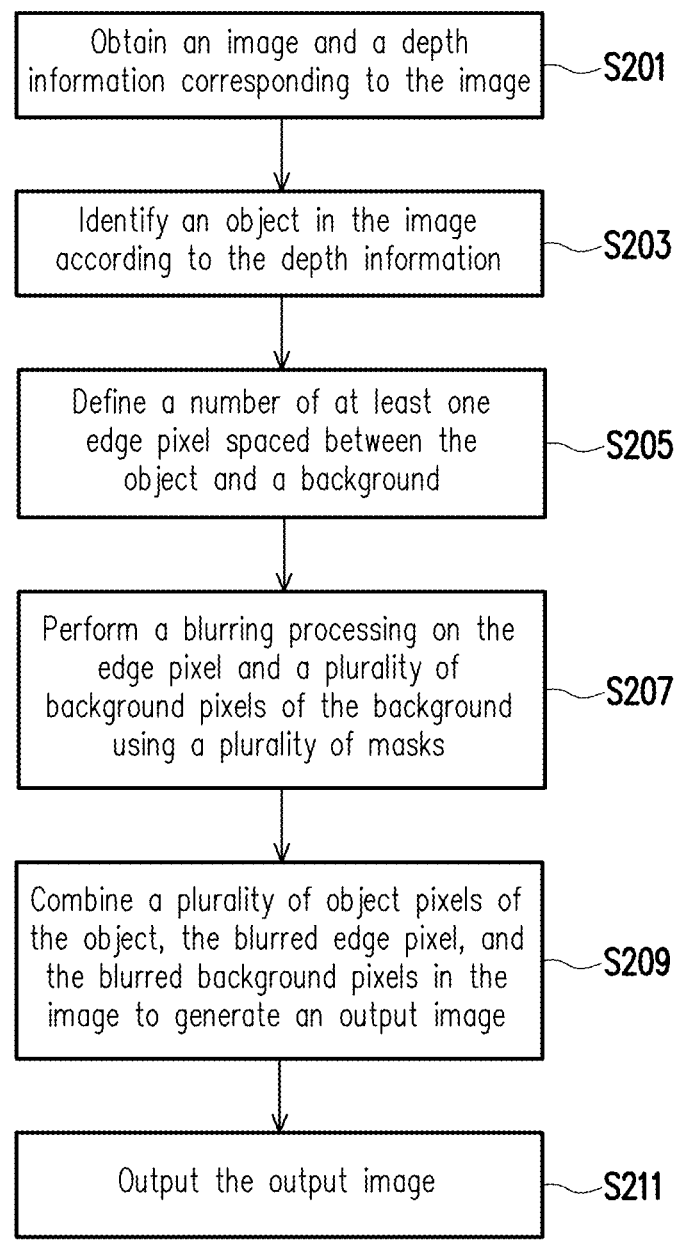
FIG. 2 is a flowchart of a method for image blurring processing shown according to an embodiment of the invention.

FIG. 2 is a flowchart of a method for image blurring processing shown according to an embodiment of the invention.

Referring to FIG. 1 and FIG. 2 simultaneously, the processor 240 may first capture an image via the image-capture circuit 242 and obtain depth information corresponding to the image via the depth-sensing circuit 244 (step S201). In other words, the depth information obtained by the depth-sensing circuit 244 may be used to obtain the depth of each pixel in the image captured by the image-capture circuit 242.

Thereafter, the processor 240 may identify an object (i.e., the foreground) in the image captured by the image-capture circuit 242 according to the depth information (step S203). In detail, since the depth information obtained by the depth-sensing circuit 244 may be used to obtain the depth of each pixel in the image captured by the image-capture circuit 242, a depth preset value (for example, two meters) may be set in advance. A pixel having a depth less than or equal to the depth preset value is identified as the foreground of the image, and a pixel larger than the depth preset value is identified as the background, wherein the object located in the foreground is regarded as the object above.

Next, the processor 240 defines the number of at least one edge pixel spaced between the object and the background according to the manufacturer/user setting or according to the size of the color contrast of the foreground and the background (step S205). For example, FIG. 3 is a schematic of an object, an edge pixel, and a background in an image shown according to an embodiment of the invention.

Figure 3:
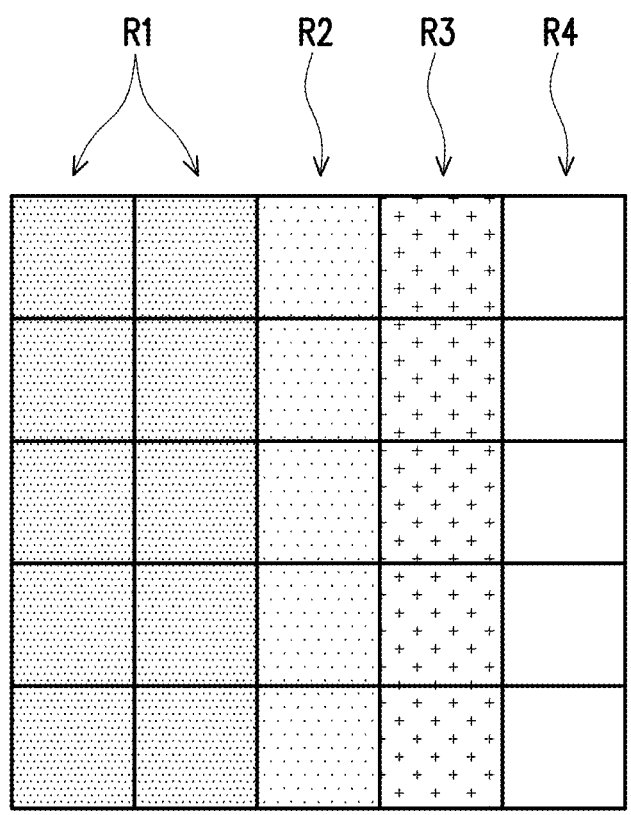
FIG. 3 is a schematic of an object, an edge pixel, and a background in an image shown according to an embodiment of the invention.

Referring to FIG. 3, an image 300 is one image of 5*5 pixels. The pixels (also referred to as object pixels) in region R1 in the image 300 are identified as objects (i.e., foreground) in the image by steps S201 to S203. The system 1000 for image blurring processing presets or automatically sets the number of the edge pixel spaced between the object and the background to 2. Therefore, the processor 240 may define the pixels in regions R2 to R3 in the image 300 as the edge pixels via the distance of two pixels extended outward from the edge of region R1 (i.e., the object). Further, the remaining region R4 in the image 300 is identified as the background, and the pixels in region R4 may be defined as background pixels.

Referring to FIG. 2 again, after step S205 is performed, the processor 240 performs blurring processing on the edge pixels and the background pixels respectively using a plurality of masks (step S207). The blurring processing involves, for example, processing the image using a Gaussian Blur mask, which is known in the prior art and is not repeated herein. Following the example of FIG. 3, when blurring processing is performed on the edge pixels belonging to regions R2 to R3 and the background pixels in region R4, the mask (also referred to as a first mask) for performing blurring processing on the edge pixels in regions R2 to R3 is different from the mask (also referred to as a second mask) for performing blurring processing on the background pixels in region R4. Since a mask with a larger size produces a stronger blurring effect, in the present embodiment, the size of the first mask (for example, 7×7) is smaller than the size of the second mask (for example, 19×19).

In particular, in the present embodiment, the edge pixels in regions R2 to R3 may also be divided into near-edge pixels and far-edge pixels according to the distance from the object. For example, the processor 240 may identify the pixels in region R2 as the near-edge pixels and identify the pixels in region R3 as the far-edge pixels. In the present embodiment, the distance between each near-edge pixel and the object is zero pixels, and the distance between each far-edge pixel and the object is one pixel. In other words, the distance between each near-edge pixel and the object is less than the distance between each far-edge pixel and the object. In the present embodiment, the mask acting on the edge regions may further include a mask (also referred to as a third mask) for performing blurring processing on the near-edge pixels and a mask (also known as a fourth mask) for performing blurring processing on the far-edge pixels. In the present embodiment, the size of the third mask (for example, 3×3) is smaller than the size of the fourth mask (for example, 5×5). In other words, after the blurring processing is performed on regions R2 and R3 using the third mask and the fourth mask, respectively, region R3 is blurrier with respect to region R2. In addition, region R4 is blurrier with respect to region R3.

Then, referring to FIG. 2 again, the processor 240 may combine a plurality of object pixels of the object without the blurring processing, the edge pixels after the blurring processing, and the background pixels without the blurring processing in the image to generate an output image (step S209) and output the output image (step S211).

In the foregoing example, the processor 240 can, for example, take out the pixels without the blurring processing in region R1 from the image captured by the image-capture circuit 242, perform blurring processing on the image captured by the image-capture circuit 242 using the third mask and only take out the pixels after the blurring processing in region R2, perform blurring processing on the image captured by the image-capture circuit 242 using the fourth mask and only take out the pixels after the blurring processing in region R3, and perform blurring processing on the image captured by the image-capture circuit 242 using the second mask and only take out the pixels after the blurring processing in region R4. Thereafter, the processor 240 may combine the pixels without the blurring processing in region R1, the pixels after the blurring processing in region R2 (according to the third mask), the pixels after the blurring processing in region R3 (according to the fourth mask), and the pixels after the blurring processing in region R4 (according to the second mask) to generate an output image.

However, in other embodiments, the processor 240 may also respectively take out the regions of regions R1 to R4 from the image captured by the image-capture circuit 242 and perform blurring processing on the pixels in the extracted region R2 using the third mask, perform blurring processing on the pixels in the extracted region R3 using the fourth mask, and perform blurring processing on the pixels in the extracted region R4 using the second mask. Thereafter, the processor 240 may combine the pixels without the blurring processing in region R1, the pixels after the blurring processing in region R2 (according to the third mask), the pixels after the blurring processing in region R3 (according to the fourth mask), and the pixels after the blurring processing in region R4 (according to the second mask) to generate an output image.

The method for image blurring processing of the invention is explained below by an example.

FIG. 4A to FIG. 4J are exemplary schematics of the effect of blurring edge pixels with different mask sizes according to each embodiment of the invention. For ease of description, the examples of FIG. 4A to FIG. 4J are illustrated using a single channel (gray scale), and are exemplified by 20 one-dimensional pixels to exemplarily illustrate the blurring processing effect of edge pixels using different mask sizes.

Figures 4A, 4B:
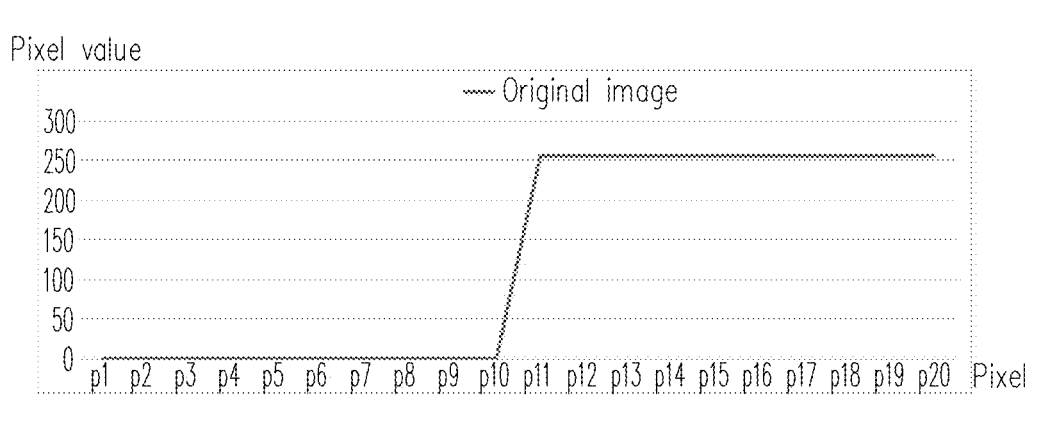
FIG. 4A to FIG. 4J are exemplary schematics of the effect of blurring edge pixels with different mask sizes according to each embodiment of the invention.

Referring to FIG. 4A and FIG. 4B simultaneously, in FIG. 4A, the pixel values of pixels p1 to p10 in the image captured by the image-capture circuit 242 are 0 (i.e., black), and the pixel values of pixels p11 to p20 are 255 (i.e., white). The black pixels are the object (i.e., foreground). After the pixel values of pixels p1 to p20 are imaged, a line graph as shown in FIG. 4B may be obtained. It may be clearly seen that the gradient of the boundary of the two black and white pixels p10 and p11 is quite significant.

Figures 4C, 4D:
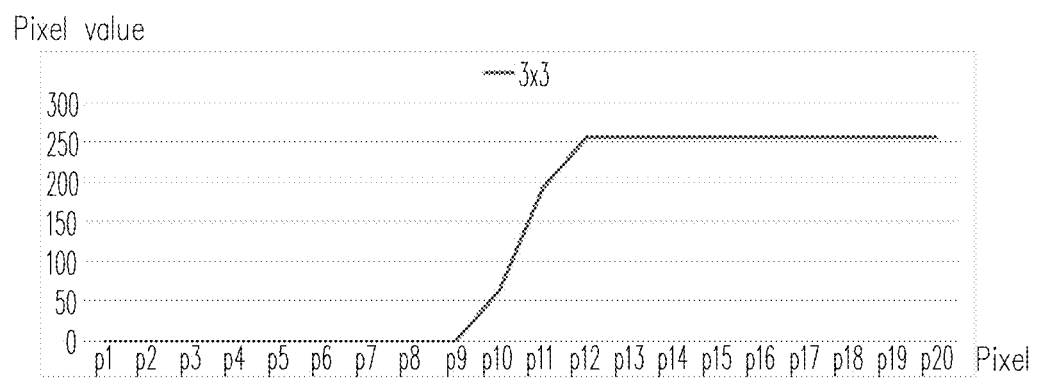

Referring to FIG. 4C, when the processor 240 uses, for example, a mask with a size of 3×1 and the weights of the pixels in the mask are respectively [1, 2, 1] and blurring processing is performed using the mask, the processor 240 multiplies the pixel value of an object pixel by 2, individually multiplies the pixel values located at the left and right sides of the object pixel by 1, and sums the above values then divides the result by 4, and uses the obtained quotient as the new pixel value of the object pixel. After performing the blurring processing on pixels p1 to p20, respectively, it may be seen that the pixel values of pixels p10 to p11 are changed. After being imaged, as shown in FIG. 4D, it may be seen that the two pixels p10 to p11 are no longer the original black and white, but are blurred into gray pixels, and the gradient of the boundary of the black and white pixels is also gentler.

Figure 4E:
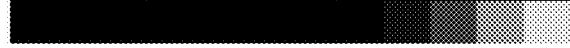
Figure 4F:
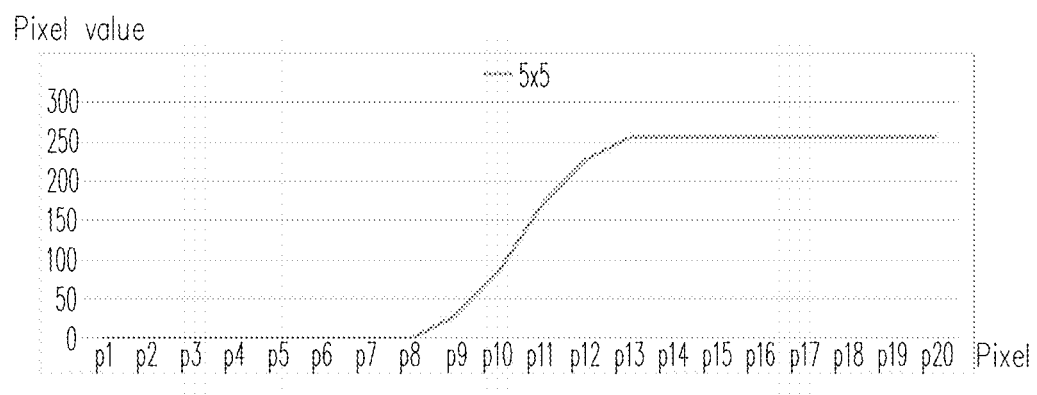

Referring to FIG. 4E, the processor 240 uses, for example, a mask with a size of 5×1 and the weights of the pixels in the mask are [1, 2, 4, 2, 1], respectively, and blurring processing is performed using the mask. After the blurring processing is performed on pixels p1 to p20, respectively, it may be seen that not only are the pixel values of pixels p10 to p11 changed, but also pixels p9 and p12 are blurred into gray pixels, and the gradient of the boundary of the black and white pixels is gentler, as shown in FIG. 4F.

Figure 4G:
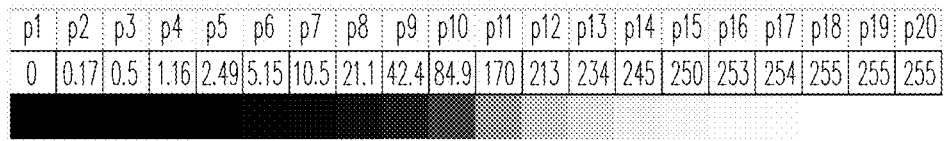
Figure 4H:
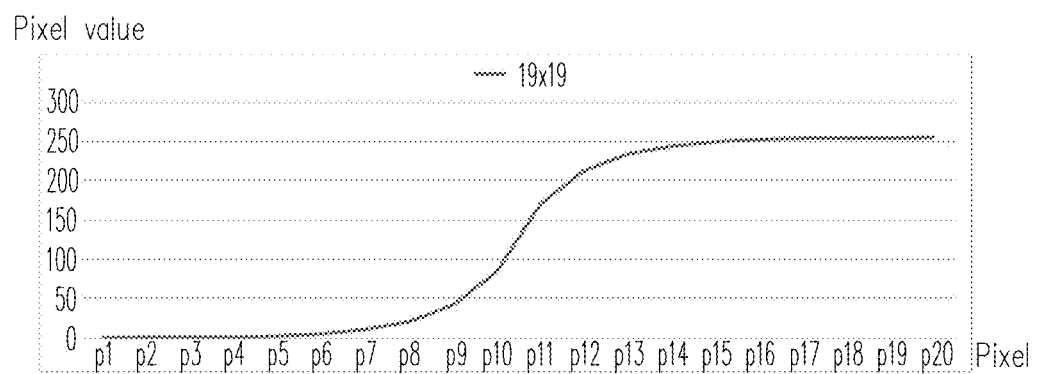

Referring to FIG. 4G, the processor 240 uses, for example, a mask with a size of 19×1 and the weights of the pixels in the mask are [1, 2, 4, 8, 16, 32, 64, 128, 256, 512, 256, 128, 64, 32, 16, 8, 4, 2, 1], respectively, and blurring processing is performed using the mask. After the blurring processing is performed on pixels p1 to p20, respectively, as shown in FIG. 4F, the boundary is almost blurred into a curve. That is to say, the gentler the gradient at the boundary, the closer the color is, i.e., the black foreground is spread to the background. It should be mentioned that, it may be seen from FIG. 4D, FIG. 4F, and FIG. 4H that the larger the mask, the greater the effect of blurring, and the more significantly the color spreads outward at the edge.

Therefore, when the degree of blurring of the edge pixels between the foreground and the background is to be adjusted or controlled, different selected pixels in FIG. 4A, FIG. 4C, FIG. 4E, and FIG. 4G blurred using masks with different sizes may be taken and combined to generate an output image.

Figures 4I, 4J:
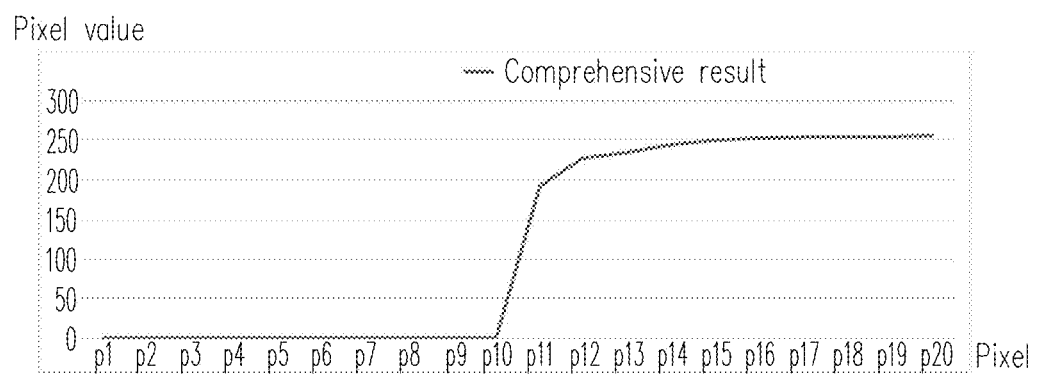

In more detail, referring to FIG. 4I, in an embodiment, the processor 240 may take out the pixel values of pixels p1 to p10 (i.e., no mask, corresponding to the pixels of the object) in FIG. 4A, the pixel value of pixel p11 (i.e., using a 3×1 mask, corresponding to the near-edge pixels) in FIG. 4C, the pixel value of pixel p12 (i.e., using a 5×1 mask, corresponding to the far-edge pixels) in FIG. 4E, and the pixel values of pixels p13 to p20 (i.e., using a 19×1 mask, corresponding to the background pixels) in FIG. 4G and combine the pixels to generate an output image composed of the pixels in FIG. 4I. In other embodiments, the processor 240 may also replace the pixel values of pixels p1 to p10 in FIG. 4G with the pixel values of pixels p1 to p10 (i.e., no mask, corresponding to the pixels of the object) in FIG. 4A, replace the pixel value of pixel p11 in FIG. 4G with the pixel value of pixel p11 (i.e., using a 3×1 mask, corresponding to the near-edge pixels) in FIG. 4C, and replace the pixel value of pixel p12 in FIG. 4G with the pixel value of pixel p12 (i.e., using a 5×1 mask, corresponding to the far-edge pixels) in FIG. 4E to generate an output image composed of the pixels in FIG. 4I.

As shown in FIG. 4J, the pixel difference between pixel p10 and pixel p11 is quite significant. The edge pixels p11 to p12 and the background pixels p13 to p20 have a blurring effect, and pixels p1 to p10 belonging to the object are clear and unblurred. The boundary between pixel p10 and pixel p11 also has a clearing effect, which may substantially alleviate the issue of the edge of the person extending outward.

Referring to FIG. 2 again, it should be noted that in step S205, two edge pixels are arranged between the object and the background as an example for description. However, the invention does not intend to limit the number of edge pixels spaced between the object and the background. In an embodiment, the processor 240 may store, for example, a corresponding relationship of a plurality of color differences and a plurality of preset numbers of the edge pixels in the storage circuit 248 in advance. The corresponding relationship of the color difference and the preset numbers of the edge pixels may be as shown in Table 1 below:

TABLE 1

| | Number of edge pixels to be spaced apart | | | |
|---|---|---|---|---|
| | 1 | 2 | 3 | 4 |
| Color difference | H: 0° | H: 45° | H: 90° | H: 135° |
| | S: 0% | S: 25% | S: 50% | S: 75% |
| | V: 0% | V: 25% | V: 50% | V: 75% |

In the present embodiment, the processor 240 may respectively obtain a plurality of color parameters of the object pixels of the object in a color space in step 205. In the present embodiment, the color space is the color space of HSV, and the color parameters include hue, saturation, and value. The color space of HSV represents points in the RGB color space in a cylindrical coordinate system. The geometry structure of the color space of HSV is more intuitive than the color space of the RGB. In particular, the hue (H) is the basic attribute of color, which is the so-called color name, such as red, yellow, etc., and the range thereof is between 0° and 360°. Saturation (S) refers to the purity of color. The higher the saturation, the purer the color is. The lower the saturation, the more the color gradually becomes gray. Saturation is between 0% and 100%. The value (V) is between 0% and 100%.

When the difference between the object (i.e., foreground) and the background is substantial, the larger the number of the edge pixels spaced between the object and the background, the smoother the diffusion of the edges of the person may be blurred. If the maximum value of the preset number of the edge pixels spaced between the object and the background is N, then the color space of HSV may be divided into N equal parts, wherein N is a positive integer. As shown in Table 1 above, if the maximum value of the preset number of the edge pixels spaced between the object and the background is 4, then the color space of HSV may be equally divided into 4 parts. By detecting and determining the difference between the object and the background color, the processor 240 may automatically select the number of the edge pixels spaced between the object and the background in the image. In the present embodiment, only one of the difference values of the color spaces H, S, and V needs to meet the preset condition.

For example, in step S205, the processor 240 respectively obtains the H value, S value, and V value of each object pixel of the object in the image in the color space of HSV. In addition, the processor 240 respectively obtains the H value, S value, and V value of each background pixel of the background in the image in the color space of HSV. The processor 240 compares each H value, S value, and V value of the object pixels located at the edge in all the object pixels with the H value, S value, and V value of the background pixels adjacent to the object pixels at the edge to calculate the difference. Thereafter, the processor 240 selects a first pixel and defines the H value, S value, and V value of the first pixel as the "first color parameter". Moreover, the processor 240 further selects a second pixel and defines the H value, S value, and V value of the second pixel as the "second color parameter". In particular, a difference (also referred to as a first difference) of the first color parameter and the second color parameter is largest. In other words, in the selection of the first pixel of the object and the second pixel of the background, two pixels having the largest H value, S value, or V value difference in all the adjacent object pixels and background pixels in the entire picture are selected. For example, the first difference is the difference of the H value, and the difference of this H value is the largest in the image. Alternatively, the first difference may also be the difference of the S value, and the difference of this S value is the largest in the image. Alternatively, the first difference may also be the difference of the V value, and the difference of this V value is the largest in the image.

For example, as shown in FIG. 5, a captured image 500 includes foreground (object) pixels F1 to F10 and background pixels B1 to B15. Taking the F6 foreground edge pixel of the plurality of edge pixels as an example, when blurring processing is performed using a 3×3 mask, the background edge pixels B4, B7, and B10 adjacent thereto are first found, and then HSV difference calculation is performed using the foreground edge pixel F6 and the background edge pixels B4, B7, and B10, so that when the HSV difference is found for F2, F4, F6, F8, and F10 and the background edge pixels adjacent thereto, the H or S or V value (that is, the first difference) with the largest difference is taken, and the adjacent two pixels generating the H or S or V value with the largest difference are the aforementioned first pixel and second pixel.

After the first difference is obtained, the processor 240 may define the number of the edge pixels spaced between the object and the background, for example, according to Table 1 and the first difference described above.

For example, the difference in which the first difference is the H value is taken as an example. When the differences between the three values of the HSV of the first pixel and the second pixel are respectively H: 105°, S: 20%, and V: 45%, the processor 240 may select the number of the edge pixels spaced between the object and the background to be three according to Table 1. That is, the processor 240 selects a first color difference (for example, H: 90°, S: 50%, and V: 55% in Table 1) corresponding to the first difference in the plurality of color differences from Table 1 according to the first difference of the first color parameter and the second color parameter. Thereafter, the processor 240 obtains a first preset number (i.e., the number of the edge pixels spaced between the object and the background is three) corresponding to the first color difference according to the first color difference. Thereafter, the processor 240 defines the first preset number as the number of the edge pixels spaced between the object and the background.

The difference in which the first difference is the V value is taken as an example. When the differences between the three values of the HSV of the first pixel and the second pixel are respectively H: 5°, S: 5%, and V: 80%, the processor 240 may select the number of the edge pixels spaced between the object and the background to be four according to Table 1.

Based on the above, the method for image blurring processing and the system for image blurring processing of the invention may divide an image into a plurality of regions such as an object (i.e., foreground), an edge of the object, and a background and perform blurring processing on the regions respectively using masks with different sizes and then recombine the regions in to an output image. By performing blurring process on individual regions, the processed image may achieve the effect of a blurred background and a clear person and edge.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method for an image blurring processing, comprising:
    obtaining an image and a depth information corresponding to the image;
    identifying an object and a background in the image according to the depth information, wherein the object comprises a plurality of object pixels, and the background comprises a plurality of background pixels;
    determining a number of at least one edge pixel spaced between the object and the background by detecting a color difference between the adjacent object pixels and the background pixels;
    performing a blurring processing on the number of at least one edge pixel and the plurality of background pixels respectively using a plurality of masks with different sizes;
    combining the plurality of object pixels, the edge pixel after the blurring processing, and the plurality of background pixels after the blurring processing to generate an output image; and
    outputting the output image,
    wherein a first mask is used for the blurring processing performed on the edge pixel, a second mask is used for the blurring processing performed on the background pixels, and a size of the first mask is less than a size of the second mask,
    wherein the first mask comprises a plurality of first weights correspond to at least one of the object pixels, the edge pixels and the background pixels, the second mask comprises a plurality of second weights correspond to at least one of the object pixels, the edge pixels and the background pixels,
    wherein during the blurring processing, at least one value of at least one of the edge pixels is multiplied by the plurality of the second weights to obtain at least one new value of the at least one edge pixel, and at least one value of at least one of the background pixels is multiplied by the plurality of the first weights to obtain at least one new value of the at least one processed background pixel.

2. The method for the image blurring processing of claim 1, wherein the edge pixel comprises a plurality of near-edge pixels and a plurality of far-edge pixels, and a distance between each of the plurality of near-edge pixels and the object is less than a distance between each of the plurality of far-edge pixels and the object.

3. The method for the image blurring processing of claim 2, wherein the first mask comprises a third mask for performing the blurring processing on the plurality of near-edge pixels and a fourth mask for performing the blurring processing on the plurality of far-edge pixels, and a size of the third mask is less than a size of the fourth mask.

4. The method for the image blurring processing of claim 1, wherein the step of determining the number of the edge pixel spaced between the object and the background by detecting the color difference between the adjacent object pixels and the background pixels comprises:
    obtaining, respectively, a plurality of color parameters of the plurality of object pixels in a color space;
    obtaining, respectively, a plurality of color parameters of the plurality of background pixels adjacent to the object pixels in the color space;
    comparing the color parameter of each of the adjacent object pixels with the color parameter of each of the background pixels and calculating a difference respectively;
    finding a largest first difference from all of the differences and selecting a first color parameter from the plurality of color parameters of the plurality of object pixels and selecting a second color parameter from the plurality of color parameters of the plurality of background pixels according to the first difference; and
    defining the number of the edge pixel spaced between the object and the background according to the first difference of the first color parameter and the second color parameter.

5. The method for the image blurring processing of claim 4, further comprising:
    pre-storing a corresponding relationship of a plurality of color differences and a plurality of preset numbers of the edge pixel,
    wherein the step of defining the number of the edge pixel spaced between the object and the background according to the first difference of the first color parameter and the second color parameter comprises:
        selecting a first color difference corresponding to the first difference in the plurality of color differences according to the first difference of the first color parameter and the second color parameter;
        obtaining a first preset number corresponding to the first color difference in the plurality of preset numbers according to the first color difference; and
        defining the first preset number as the number of the edge pixel spaced between the object and the background.

6. The method for the image blurring processing of claim 4, wherein the color space is a color space of HSV.

7. A system for an image blurring processing, comprising:
    an image-capture circuit for obtaining an image;
    a depth-sensing circuit for obtaining a depth information corresponding to the image; and
    a processor coupled to the image-capture circuit and the depth-sensing circuit, wherein
    the processor identifies an object and a background in the image according to the depth information, wherein the object comprises a plurality of object pixels, and the background comprises a plurality of background pixels,
    the processor determines a number of at least one edge pixel spaced between the object and the background by detecting a color difference between the adjacent object pixels and the background pixels,
    the processor performs a blurring processing on the number of at least one edge pixel and the plurality of background pixels of the background respectively using a plurality of masks with different sizes, the processor combines the plurality of object pixels, the edge pixel after the blurring processing, and the plurality of background pixels after the blurring processing to generate an output image, and the processor outputs the output image, wherein a first mask is used for the blurring processing performed on the edge pixel, a second mask is used for the blurring processing performed on the background pixels, and a size of the first mask is less than a size of the second mask, wherein the first mask comprises a plurality of first weights correspond to at least one of the object pixels, the edge pixels and the background pixels, the second mask comprises a plurality of second weights correspond to at least one of the object pixels, the edge pixels and the background pixels, wherein during the blurring processing, at least one value of at least one of the edge pixels is multiplied by the plurality of the second weights to obtain at least one new value of the at least one edge pixel, and at least one value of at least one of the background pixels is multiplied by the plurality of the first weights to obtain at least one new value of the at least one processed background pixel.

8. The system for the image blurring processing of claim 7, wherein the edge pixel comprises a plurality of near-edge pixels and a plurality of far-edge pixels, and a distance between each of the plurality of near-edge pixels and the object is less than a distance between each of the plurality of far-edge pixels and the object.

9. The system for the image blurring processing of claim 8, wherein the first mask comprises a third mask for performing the blurring processing on the plurality of near-edge pixels and a fourth mask for performing the blurring processing on the plurality of far-edge pixels, and a size of the third mask is less than a size of the fourth mask.

10. The system for the image blurring processing of claim 7, wherein during the operation of determining the number of the edge pixel spaced between the object and the background by detecting the color difference between the adjacent object pixels and the background pixels, the processor obtains, respectively, a plurality of color parameters of the plurality of object pixels in a color space, the processor obtains, respectively, a plurality of color parameters of the plurality of background pixels adjacent to the object pixels in the color space, the processor compares the color parameter of each of the adjacent object pixels with the color parameter of each of the background pixels and calculates a difference respectively;

the processor finds a largest first difference from all of the differences and selects a first color parameter from the plurality of color parameters of the plurality of object pixels and selects a second color parameter from the plurality of color parameters of the plurality of background pixels according to the first difference, and the processor defines the number of the edge pixel spaced between the object and the background according to a first difference of the first color parameter and the second color parameter.

11. The system for the image blurring processing of claim 10, further comprising:

a storage circuit for pre-storing a corresponding relationship of a plurality of color differences and a plurality of preset numbers of the edge pixel, wherein during the operation of defining the number of the edge pixel spaced between the object and the background according to the first difference of the first color parameter and the second color parameter, the processor selects a first color difference corresponding to the first difference in the plurality of color differences according to the first difference of the first color parameter and the second color parameter, the processor obtains a first preset number corresponding to the first color difference in the plurality of preset numbers according to the first color difference, and the processor defines the first preset number as the number of the edge pixel spaced between the object and the background.

12. The system for the image blurring processing of claim 10, wherein the color space is a color space of HSV.

* * * * *